(12) United States Patent
Cheng et al.

(10) Patent No.: US 10,162,997 B2
(45) Date of Patent: Dec. 25, 2018

(54) ELECTRONIC DEVICE, COMPUTER READABLE STORAGE MEDIUM AND FACE IMAGE DISPLAY METHOD

(71) Applicant: ASUSTeK COMPUTER INC., Taipei (TW)

(72) Inventors: Yi-Chi Cheng, Taipei (TW); Wei-Po Lin, Taipei (TW); Hsiu-Jui Kuo, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/376,901

(22) Filed: Dec. 13, 2016

(65) Prior Publication Data

US 2017/0185824 A1    Jun. 29, 2017

Related U.S. Application Data

(60) Provisional application No. 62/271,306, filed on Dec. 27, 2015.

(30) Foreign Application Priority Data

Nov. 16, 2016   (TW) .............................. 105137538 A

(51) Int. Cl.
G06K 9/00     (2006.01)
G09G 5/00     (2006.01)
G06T 11/00    (2006.01)

(52) U.S. Cl.
CPC .......... G06K 9/00248 (2013.01); G06T 11/00 (2013.01); G09G 5/00 (2013.01)

(58) Field of Classification Search
CPC ....... G06T 11/60; G06T 3/40; G06K 9/00221; G06K 9/00268; G06K 9/00302

USPC .................................................. 382/118, 195
See application file for complete search history.

(56) References Cited

U.S. PATENT DOCUMENTS

| | | | |
|---|---|---|---|
| 2005/0135675 A1 | 6/2005 | Chen et al. | |
| 2007/0019882 A1 | 1/2007 | Tanaka et al. | |
| 2012/0223956 A1 | 9/2012 | Saito et al. | |
| 2014/0016823 A1* | 1/2014 | Ye ........................... | G06T 19/20 382/103 |
| 2014/0210514 A1 | 7/2014 | Lin et al. | |
| 2014/0210814 A1 | 7/2014 | Kim et al. | |

(Continued)

FOREIGN PATENT DOCUMENTS

| | | |
|---|---|---|
| CN | 102736727 A | 10/2012 |
| CN | 103970525   | 8/2014 |

(Continued)

OTHER PUBLICATIONS

Office Action issued in corresponding Taiwan patent application dated Apr. 27, 2017.

*Primary Examiner* — Daniel Mariam
(74) *Attorney, Agent, or Firm* — McClure, Qualey & Rodack, LLP

(57) ABSTRACT

A face image display method applied to an electronic device is provided. The face image display method includes: obtaining a real-time face image, defining a first feature region on the real-time face image, capturing a first feature region image including the first feature region, enlarging the first feature region image into a first output image; and displaying the first output image on a first display area of the display unit.

20 Claims, 18 Drawing Sheets

(56) References Cited

U.S. PATENT DOCUMENTS

2015/0262403 A1    9/2015  Yamanashi
2016/0157587 A1    6/2016  Yamanashi et al.
2016/0357578 A1*  12/2016  Kim .................... G06F 9/4446
2017/0124385 A1*   5/2017  Ganong ............ G06F 17/30244

FOREIGN PATENT DOCUMENTS

| | | |
|---|---|---|
| CN | 104205168 | 12/2014 |
| TW | 200521851 | 7/2005 |
| TW | 200739446 | 10/2007 |
| TW | 201344623 | 11/2013 |
| TW | 201411506 | 3/2014 |

* cited by examiner

ELECTRONIC DEVICE, COMPUTER READABLE STORAGE MEDIUM AND FACE IMAGE DISPLAY METHOD

CROSS-REFERENCE TO RELATED APPLICATION

This application claims the priority benefit of U.S. provisional application Ser. No. 62/271,306, filed on Dec. 27, 2015 and Taiwan application serial No. 105137538, filed on Nov. 16, 2016. The entirety of the above-mentioned patent application is hereby incorporated by reference herein and made a part of specification.

BACKGROUND OF THE INVENTION

Field of the Invention

The invention relates to a display technique, more specifically, to a virtual image display technique.

Description of the Related Art

With the development of science and technology, a virtual makeup system is provided for users, and then different makeup effects on photographs can be easily preview by users.

Currently, a virtual makeup system only provides an image with a virtual makeup effect without other information, which is rather inconvenience.

BRIEF SUMMARY OF THE INVENTION

According to first aspect of the disclosure, a face image display method is disclosed. The face image display method, applied to an electronic device with a display unit. The method comprises: obtaining a real-time face image; defining a first feature region on the real-time face image; capturing a first feature region image including the first feature region; enlarging the first feature region image into a first output image; and displaying the first output image on a first display area of the display unit.

According to second aspect of the disclosure, a computer readable storage medium storing a plurality of program codes is disclosed. The computer readable storage medium stores a plurality of program codes, an electronic device loads and executes the program codes to make the electronic device perform steps of: obtaining a real-time face image; defining a first feature region on the real-time face image; capturing a first feature region image including the first feature region; enlarging the first feature region image into a first output image; and displaying the first output image on a first display area of the display unit.

According to second aspect of the disclosure, an electronic device is disclosed. The electronic device comprises: an image processing unit, defining a first feature region on a real-time face image, capturing a first feature region image including the first feature region from the real-time face image, and enlarging the first feature region image into a first output image; and a display unit including a first display area and configured for displaying the first output image on the first display area.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
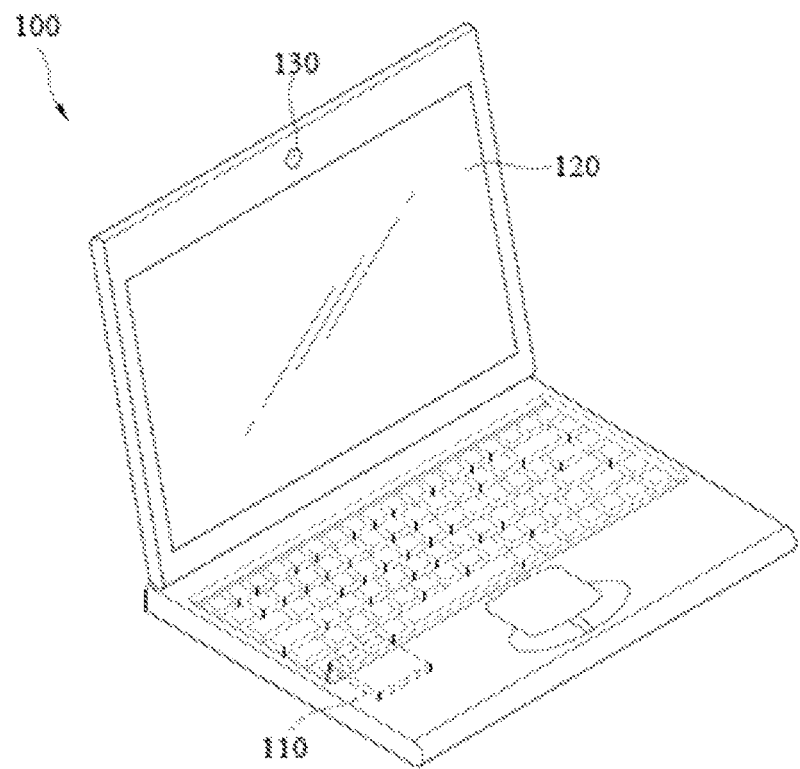
FIG. 1 is a schematic diagram showing an electronic device in an embodiment.
Figure 2:
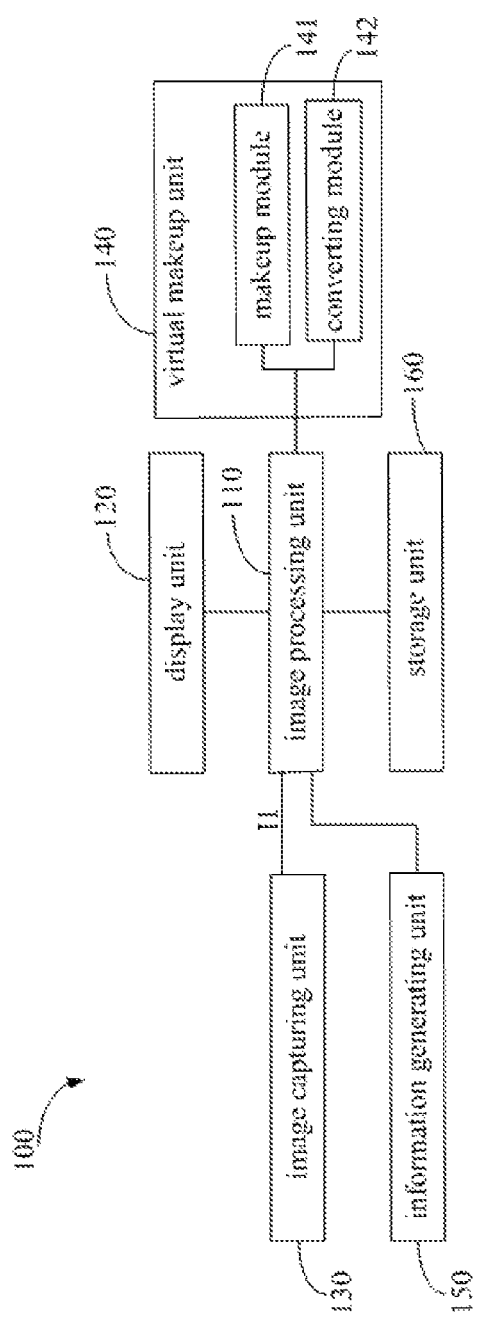
FIG. 2 is a block diagram showing an electronic device in an embodiment.
Figure 3:
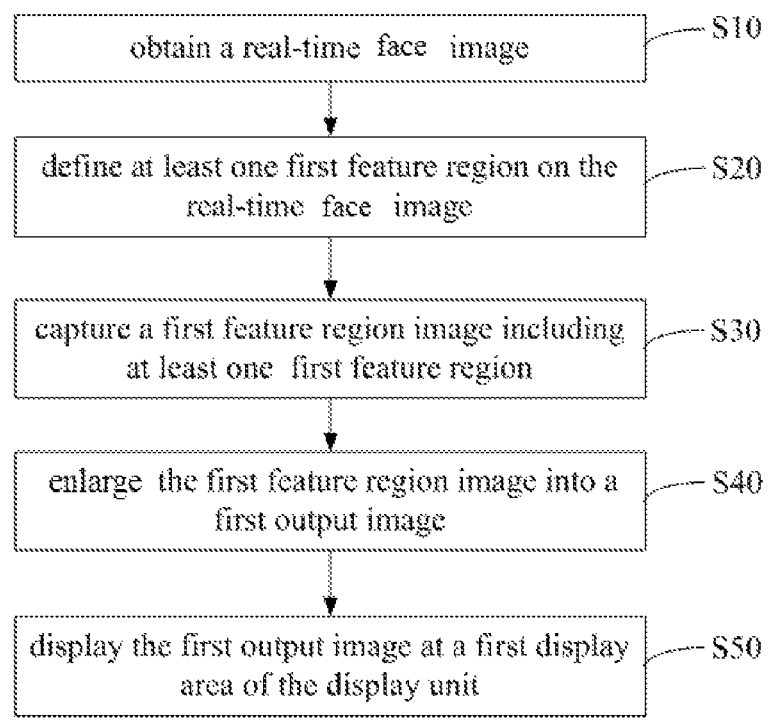
FIG. 3 is a flow chart showing a face image display method in a first embodiment.
Figure 4:
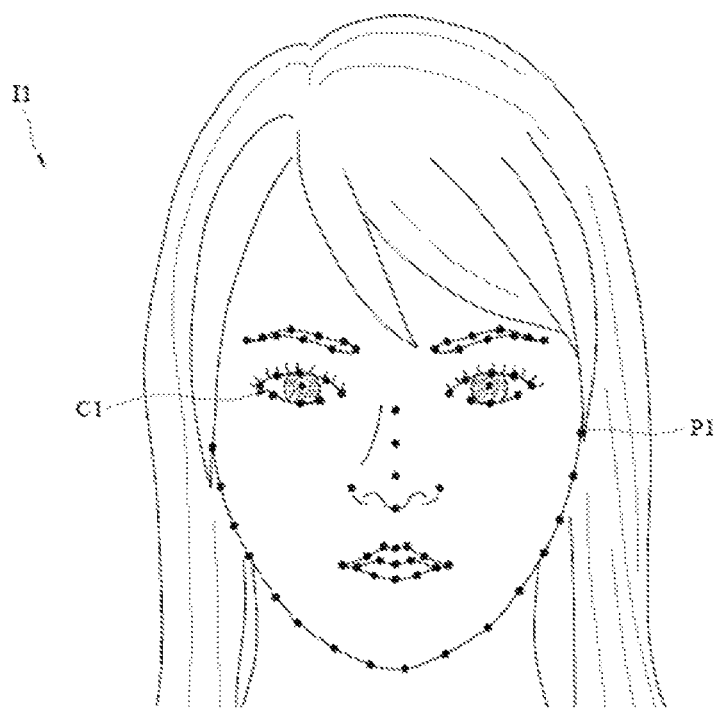
FIG. 4 is a schematic diagram showing a real-time face image in an embodiment.
Figure 5:
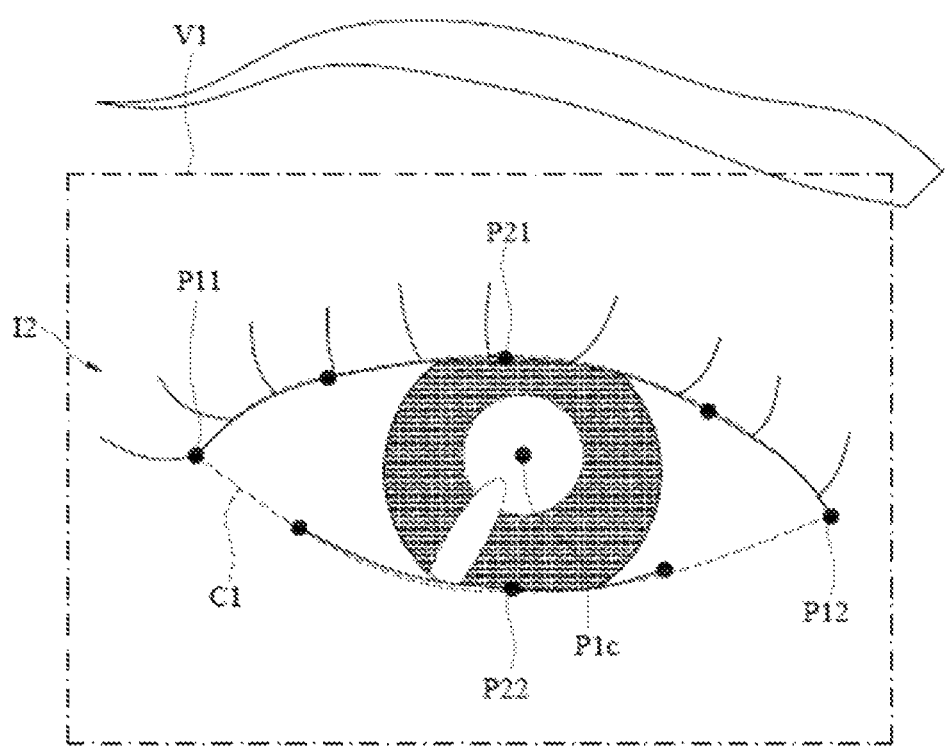
FIG. 5 is a schematic diagram showing that a first feature region image is captured in an embodiment.
Figure 6:
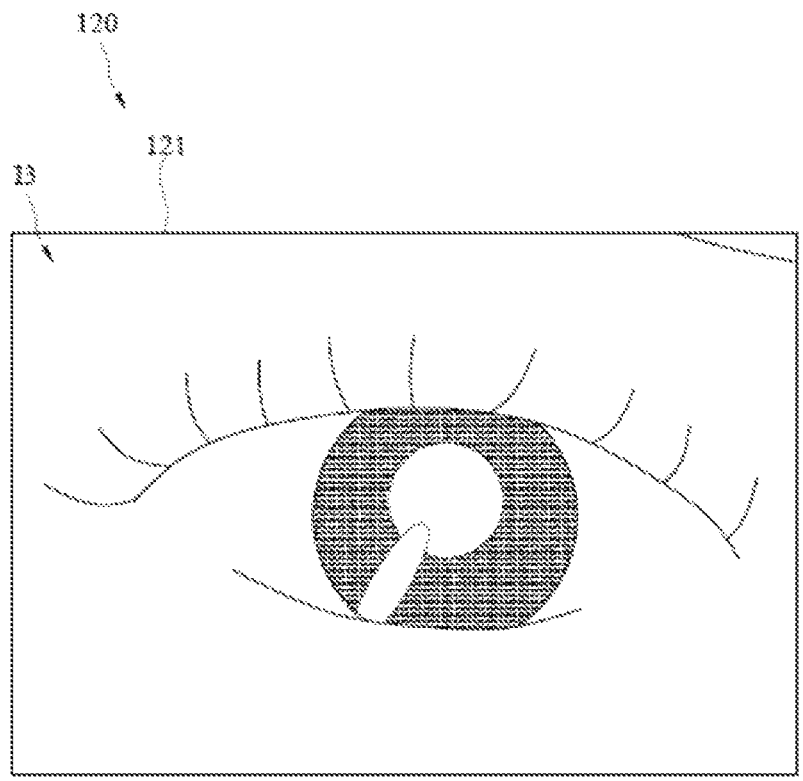
FIG. 6 is a schematic diagram showing a first output image is displayed at a first display area in an embodiment.

FIG. 1 is a schematic diagram showing an electronic device in an embodiment. FIG. 2 is a block diagram showing an electronic device in an embodiment. FIG. 3 is a flow chart showing a face image display method in an embodiment. FIG. 4 is a schematic diagram showing a real-time face image in an embodiment. FIG. 5 is a schematic diagram showing that a first feature region image is captured in an embodiment. FIG. 6 is a schematic diagram showing a first output image is displayed at a first display area. Please refer to FIG. 1 to FIG. 6, the face image display method in embodiments is adapted to be applied to an electronic device 100. One or more face features of users can be magnified and displayed on the electronic device 100 to facilitate the user checking one or more face features easily.

The electronic device 100 includes an image processing unit 110, a display unit 120 and a storage unit 160. The image processing unit 110 is connected to the display unit 120 and the storage unit 160.

After a real-time face image I1 is obtained (step S10), at least one first feature region C1 is defined (as shown in FIG. 4) on the real-time face image I1 (step S20). Then, a first feature region image I2 (as shown in FIG. 5) including at least one first feature region C1 is captured (step S30). The first feature region image I2 is magnified into a first output image I3 (step S40). Then, the image processing unit 110 transmits the first output image I3 to the display unit 120. The first output image I3 is displayed on a first display area 121 of the display unit 120 (as shown in FIG. 6) (step S50).

Figure 7:
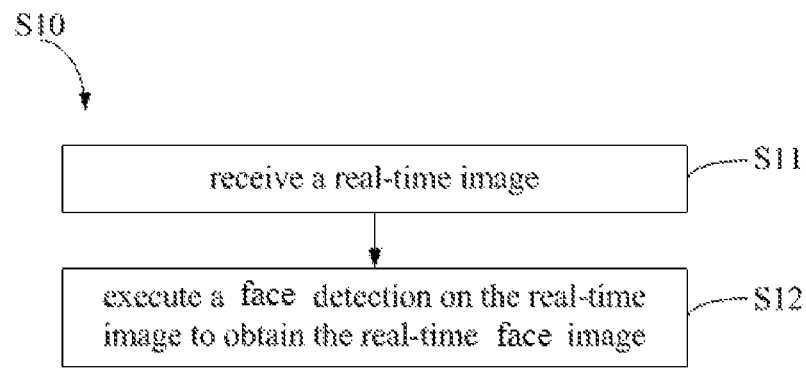
FIG. 7 is a schematic diagram showing the detail of the step S10 in FIG. 3 in an embodiment.

FIG. 7 is a schematic diagram showing the detail of the step S10 in FIG. 3 in an embodiment. Please refer to FIG. 1 to FIG. 7. In step S10, after a real-time image is received (step S11), a face detection is executed on the real-time image to obtain the real-time face image I1 (step S12).

In an embodiment, the electronic device 100 further includes an image capturing unit 130. The image capturing unit 130 is connected to the image processing unit 110. The image capturing unit 130 is used to capture the real-time image. The real-time image is a flat image or a stereo image. In an embodiment, the image capturing unit 130 is a webcam, a digital camera or a camera lens adapted for capturing the real-time image, which is not limited herein. In an embodiment, the real-time image captured by the image capturing unit 130 is stored and/or temporarily stored in the storage unit 160 for following image processing.

In an embodiment, the real-time image captured by the image capturing unit 130 is transmitted to the image processing unit 110 for image processing. The image processing unit 110 executes face detection (such as face recognition and feature points analysis) on the real-time image via a face detection algorithm (such as a feature vector method). For example, the real-time face image I1 with a face of the user is obtained from the real-time image. The real-time face image I1 includes a plurality of feature points P1, as shown in FIG. 4. In an embodiment, the image points of the real-time image are obtained to be used as feature points P1 according to difference between grayscale of each of the image points and grayscale of surrounding image point. Then, a real-time face image I1 including the feature points P1 is obtained from the real-time image.

In an embodiment, the feature points P1 is located on turning points, end points, tip points or edges of the real-time face image I1. For example, the feature point P1 is located on an outline of eyes, an outline of a lip, an outline of eyebrows, an outline of a nose tip, which is not limited herein.

In an embodiment, the feature points P1 is stored in the storage unit 160. The feature points P1 corresponding to a same face feature are associated together and then stored in the storage unit 160.

In an embodiment, after the real-time face image I1 is obtained, the real-time image I1 is displayed by the display unit 120 to allow the user to confirm images via the current display (that is, the real-time face image I1) on the display unit 120. When the real-time face image I1 is displayed on the display unit 120, the feature points P1 are selectively displayed on the real-time face image I1.

In step S20, the image processing unit 110 receives a feature selection signal. The feature selection signal is used to select the face feature in the real-time image I1. The feature selection signal is a manual input or preset by a system of the electronic device, which is not limited herein.

In step S20, when an eye is selected as the face feature via the feature selection signal, the image processing unit 110 defines a range (that is, a first feature region C1) surrounded by the plurality of feature points P1 corresponding to the eye on the real-time face image I1. When the number of the face feature selected by the feature selection signal is more than two, the image processing unit 110 defines more than two first feature regions C1 on the real-time face image I1 correspondingly. Then, positions of the face features on the real-time face image I1 are found. For example, when the face features selected by the feature selection signal are a nose and a lip, the image processing unit 110 defines a range surrounded by a plurality of feature points P1 corresponding to the nose and a range surrounded by a plurality of feature points P1 corresponding to the lip as the first feature region C1, respectively.

Figure 8:
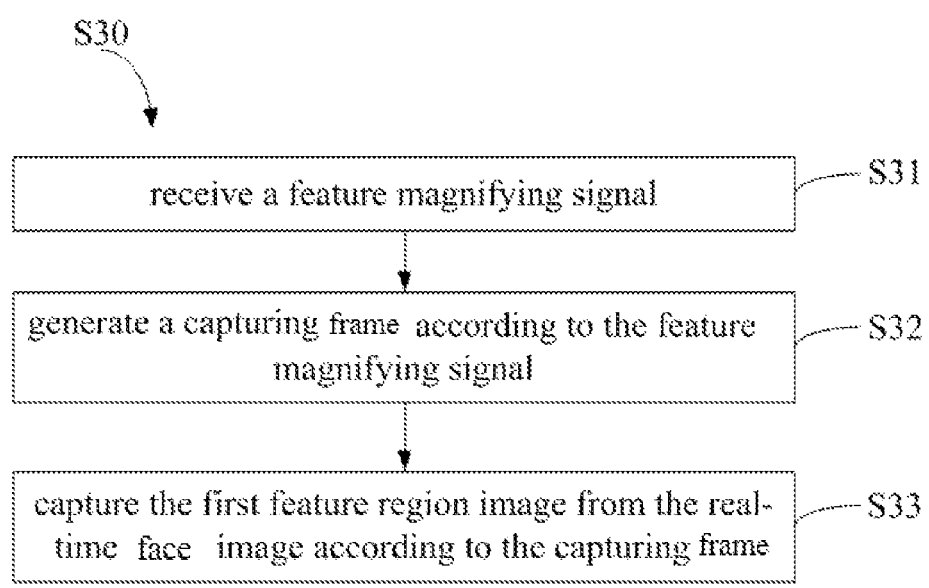
FIG. 8 is a schematic diagram showing the detail of the step S30 in FIG. 3 in an embodiment.

FIG. 8 is a schematic diagram showing the detail of the step S30 in FIG. 3 in an embodiment. Please refer to FIG. 1 to FIG. 8, in step S30, after a feature enlarging signal is received (step S31), the image processing unit 110 generates a capturing frame V1 according to the feature enlarging signal (step S32). A range of the capturing frame V1 includes at least one first feature region C1 defined in the step S20, as shown in FIG. 5. Then, the image processing unit 110 captures a first feature region image I2 from the real-time face image I1 according to the capturing frame V1 (step S33). In other words, the first feature region image I2 is a partial image including the face feature corresponding to the first feature region C1 in the real-time face image I1.

In an embodiment, the feature enlarging signal is used to make the image processing unit 110 enlarge the display of the partial image corresponding to at least one face feature in the real-time face image I1. In an embodiment, the feature enlarging signal is an internal signal generated by the image processing unit 110 after the first feature region C1 is defined.

Please refer to FIG. 5, in step 32, all the feature points P1 representing the first feature region C1 are accessed from the storage unit 160 by the image processing unit 110. Then, a central point is determined according to the feature points P1 of the first feature region C1. The capturing frame V1 including all the feature points P1 of the feature region C1 (including the first feature region C1) is generated according to the central point. The central point of each first feature region C1 is a feature point P1 among all the feature points P1 of the first feature region C1, or a middle point among all the feature point P1 of the first feature region C1, which is not limited herein. For example, as shown in FIG. 5, the face feature selected by the feature enlarging signal is an eye feature. A feature point P1c in a center of all the feature points P1 of an eyeball is selected as a central point. The capturing frame V1 is determined according to two feature points P11, P12 which are farthest from each other among all the feature points P1 of the eyeball in an first axis direction and two feature points P21, P22 which are farthest from each other among all the feature points P1 of the eyeball in a second axis direction. In an embodiment, the capturing frame V1 is defined in a range by feature points P11, P12, P21, P22 extending outwardly by a predetermined distance, which is not limited herein. In an embodiment, the capturing frame V1 is generated to comply with a length-width ratio of an image display of the displaying unit 120, such as 4:3 or 16:9. In other words, the capturing frame V1 is generated by extending from the feature points P11, P12, P21, and P22 outwardly by predetermined distances to comply with the length-width ratio. Program codes corresponding to the parameters, such as an option of the central point and the predetermined distances, are pre-stored in the storage unit 160.

In an embodiment, in the detail of the step S40, when the first feature region image I2 is different from the length-width ratio of the display area of the display unit 120, the image processing unit 110 adjusts the length-width ratio of the first feature region image I2. Then, the adjusted first feature region image I2 is magnified into a first output image I3. For example, the image processing unit 110 recalculates the new width of the first feature region image I2 according to a ratio between the original width of the first feature region image I2 and the width of the image display of the display unit 120. Similarly, in an embodiment, the image processing unit 110 recalculates the new length of the first feature region image I2 according to a ratio between the original length of the first feature region image I2 and the length of the image display of the display unit 120. In an embodiment, the image processing unit 110 adjusts the length-width ratio of the first feature region image I2 appropriately according to an image processing method, such as a scaling or a seam carving method, which is not limited herein. In an embodiment, the first feature region image I2 is directly magnified into the first output image I3, and then the first output image I3 is displayed on the display unit 120, wherein if there is a part of the display area without displaying the first output image I3, the part of the display area is displayed by black.

In an embodiment, in order to eliminate signal noises, the image processing unit 110 captures a plurality of real-time face images I1 to obtain a plurality of first feature region images I2. Then, a median operation is performed on the first feature region images I2 to generate a stable first feature region image I2. The more stable first feature region images I2 is magnified into the first output image I3.

In an embodiment, when the display unit 120 is in an initial state, the real-time face image I1 is displayed on the first display area 121. As shown in FIG. 6, after the first output image I3 is received, the first output image I3 is displayed on the first display area 121.

Figure 9:
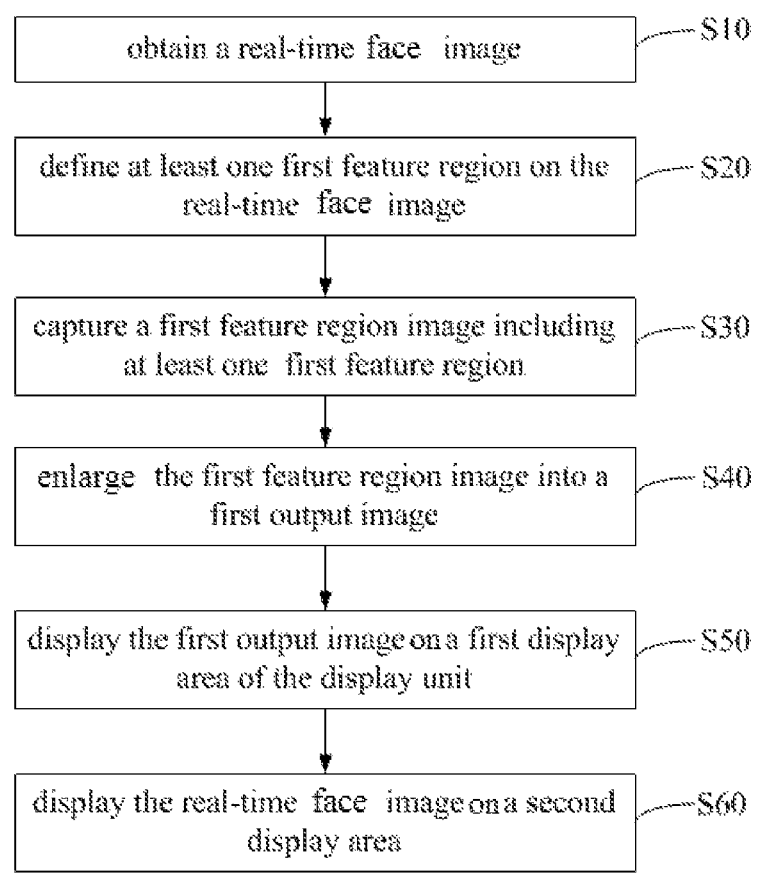
FIG. 9 is a flow chart showing a face image display method in a second embodiment.
Figure 10:
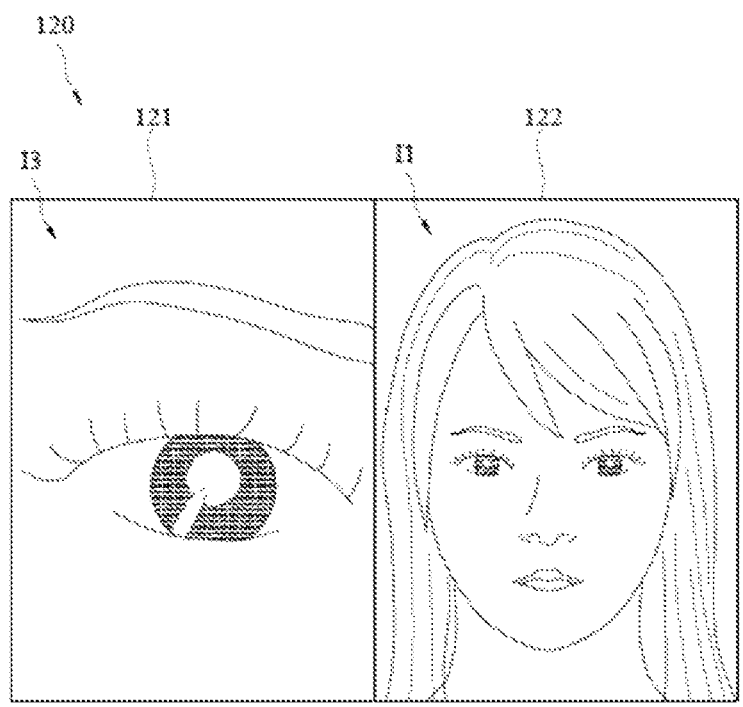
FIG. 10 is a schematic diagram showing a real-time face image and a first output image are displayed in an embodiment.

FIG. 9 is a flow chart showing a face image display method in a second embodiment. FIG. 10 is a schematic diagram showing a real-time face image and a first output image are displayed in an embodiment. Please refer to FIG. 1, FIG. 2 and FIG. 4 to FIG. 10, in an embodiment, the display unit 120 further includes a second display area 122. The display unit 120 displays the real-time face image I1 at the second display area 122 (step S60). Then a magnified image (that is, the first output image I3) including at least one face feature of the face is displayed on the first display area 121 while the real-time face image I1 including a whole face is also displayed at the second display area 122.

In an embodiment, the step S50 and the step S60 are executed synchronously, which is not limited herein. In an embodiment, the step S60 is executed after the real-time face image I1 is obtained by the image processing unit 110.

Figure 11:
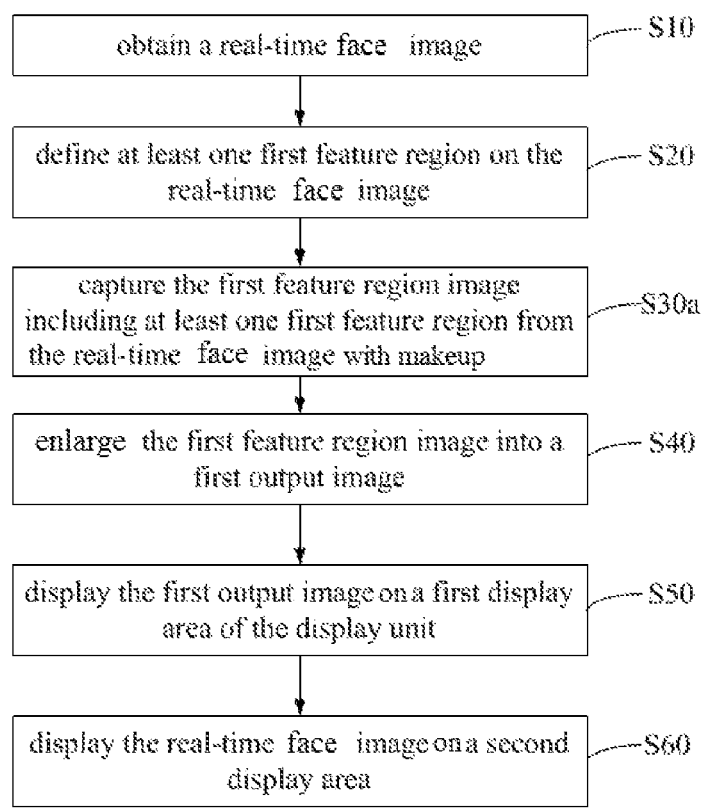
FIG. 11 is a flow chart showing a face image display method in a third embodiment.

Please refer to FIG.2 and FIG.3 and FIG. 11, the electronic device 100 further includes a virtual makeup unit 140. The virtual makeup unit 140 is connected to the image processing unit 110. The virtual makeup unit 140 is used to generate a virtual makeup corresponding to the real-time face image I1. The image processing unit 110 combines the virtual makeup generated by the virtual makeup unit 140 and real-time face image I1 into a real-time face image I4 (that is, the real-time face image with makeup)face. Then, the real-time face image I4 is displayed on the display unit 120.

Figure 12:
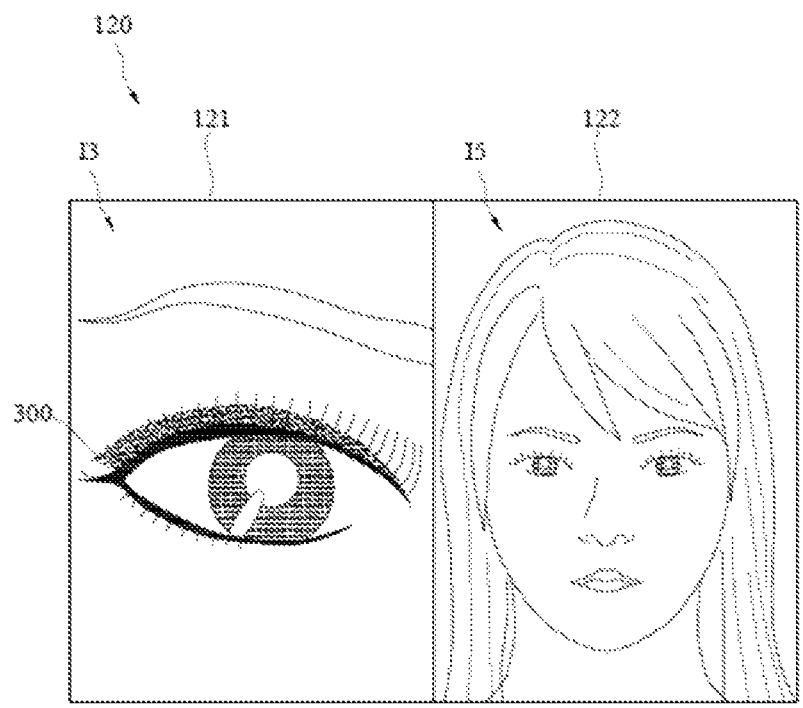
FIG. 12 is a schematic diagram showing a real-time face image without makeup and a first output image are displayed in an embodiment.
Figure 13:
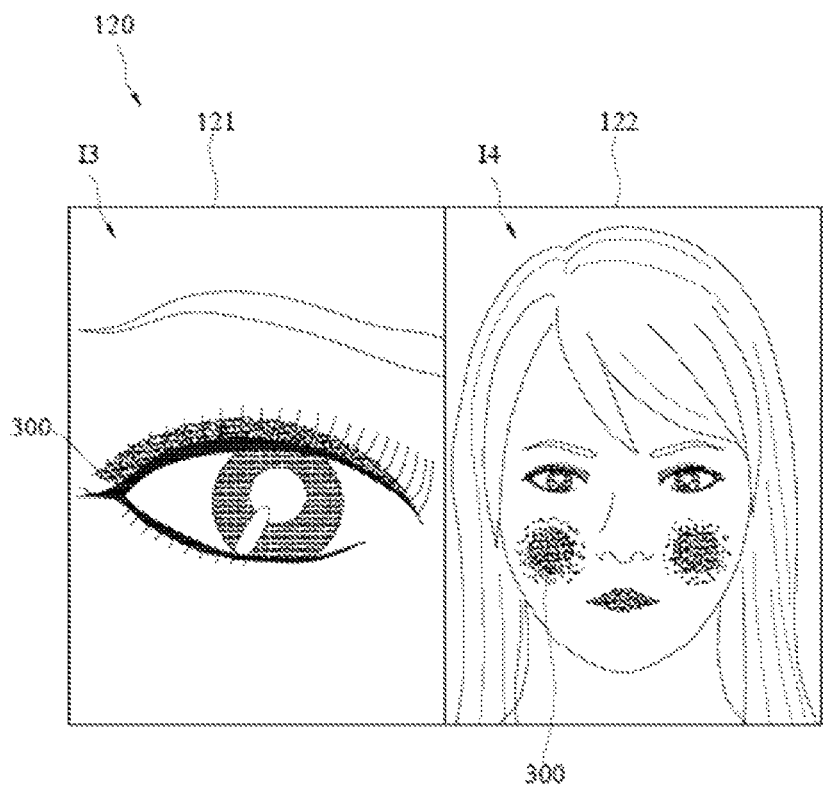
FIG. 13 is a schematic diagram showing a first output image and a real-time face image with makeup are displayed in an embodiment.

FIG. 11 is a flow chart showing a face image display method in a third embodiment. FIG. 12 is a schematic diagram showing a real-time face image without makeup and a first output image are displayed in an embodiment. FIG. 13 is a schematic diagram showing a real-time face image with makeup and a first output image are displayed in an embodiment. Please refer to FIG. 2, FIG. 11 to FIG. 13, in the embodiment, the image processing unit 110 captures the first feature region image I3 including at least one first feature region C1 from the real-time face image I4 (step S30a).

In an embodiment, the real-time face image I4 is generated by combining the virtual makeup 300 generated by the virtual makeup unit 140 and a pre-makeup real-time face image I5 (that is, the real-time face image without makeup). For example, the image processing unit 110 executes a face detection on the real-time image to obtain a real-time face image without a virtual makeup, such as the real-time face image I5, from the real-time image. Then, the virtual makeup unit 140 generates at least one virtual makeup 300 according to at least one makeup signal. The virtual makeup 300 is combined to the real-time face image I5 (that is, the real-time face image without makeup) to form the real-time face image I4 (that is, the real-time face image with makeup) face. In an embodiment, the makeup selection signal includes information about the face feature and the makeup pattern selected by the user.

The step S10 and the step S20 in the embodiment are similar to that in the first embodiment and the second embodiment, which is not repeated herein.

In an embodiment, the virtual makeup unit 140 includes a makeup module 141 and a converting module 142. The image processing unit 110 is connected to the makeup module 141 and the converting module 142. The converting module 142 is connected to the makeup module 141.

In an embodiment, in the detail of the step S30a, the makeup module 141 of the virtual makeup unit 140 gets a corresponding virtual makeup model from the virtual makeup database (built in the storage unit 160) according to at least one makeup signal. The converting module 142 adjusts the virtual makeup model to the virtual makeup 300 complied with the face feature in the real-time face image I5 according to the feature point P1 in the pre-makeup real-time face image I5. In other words, when the area, the shape or the size of the face feature in the real-time face image I5 is changed with the rotation or movement of the user, the virtual makeup 300 generated by the converting module 142 is changed accordingly.

In step S40, the image processing unit 110 magnifies the first feature region image I2 with the virtual makeup 300 into the first output image I3. In other words, both the first feature region image I2 and the first output image I3 include the virtual makeup 300. After the step S50, face feature with makeup can be seen clearly in the first output image I3 displayed at the first display area 121 of the display unit 120.

In an embodiment, after the step S50, the display unit 120 displays the real-time face image at the second display area 122 of the display unit 120 (step S60). The image displayed on the first display area 121 can be shown in comparison with the image displayed on the second display area 122. In the embodiment, the real-time face image displayed at the second display area 122 is the pre-makeup real-time face image I5 (that is, the real-time face image without makeup) or the makeup real-time face image I4 (that is, the real-time face image with makeup).

In an embodiment, as shown in FIG. 12, the display unit 120 displays the real-time face image I5 on the second display area 122. The whole face without makeup is displayed at the second display area 122. And the first output image I3 including at least one face feature with makeup is displayed on the first display area 121.

In an embodiment, as shown in FIG. 13, the display unit 120 displays the real-time face image I4 at the second display area 122. The whole face with makeup is displayed at the second display area 122. And the first output image I3 including at least one face feature with makeup is displayed on the first display area 121.

Figure 14:
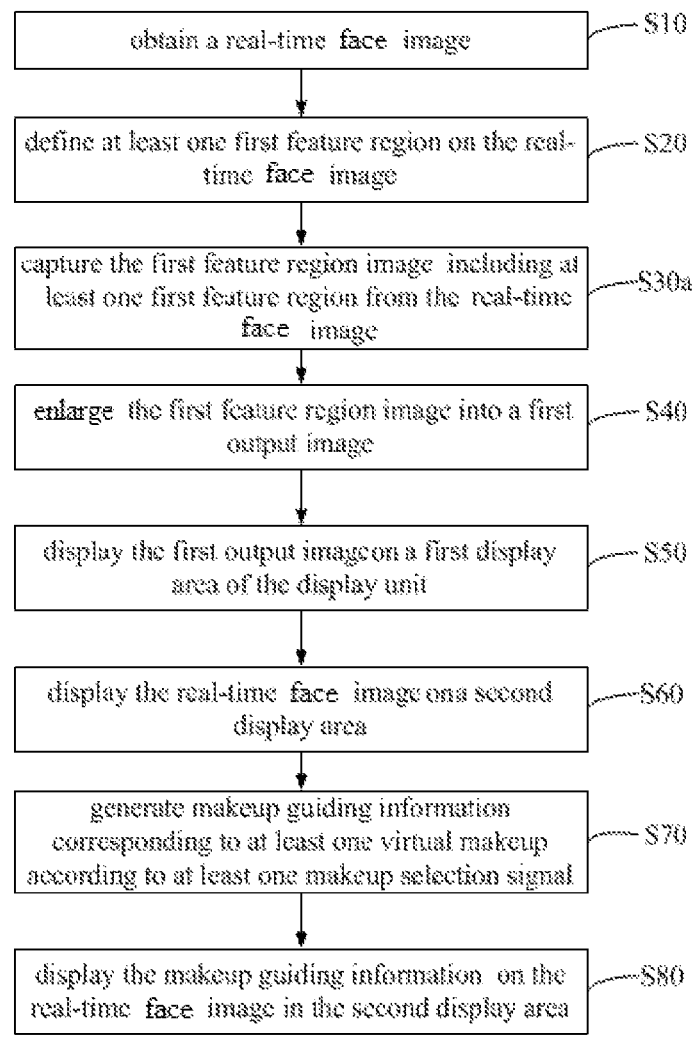
FIG. 14 is a flow chart showing a face image display method in a fourth embodiment.
Figure 15:
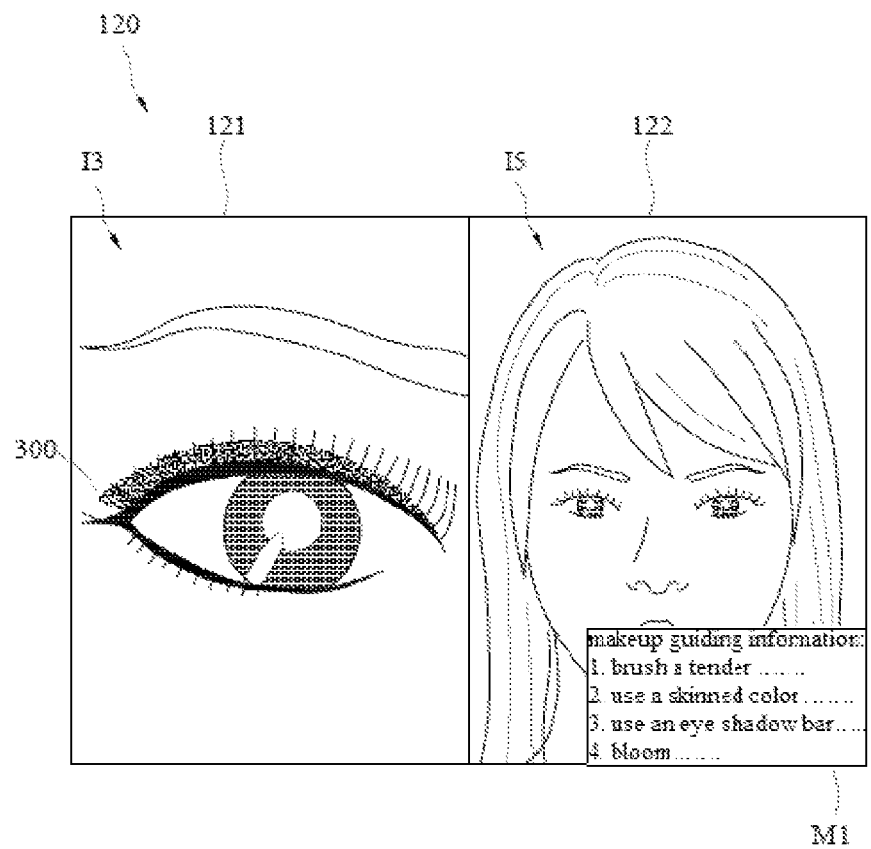
FIG. 15 is a schematic diagram showing a first output image and a real-time face image with makeup guiding information are displayed in an embodiment.
Figure 16:
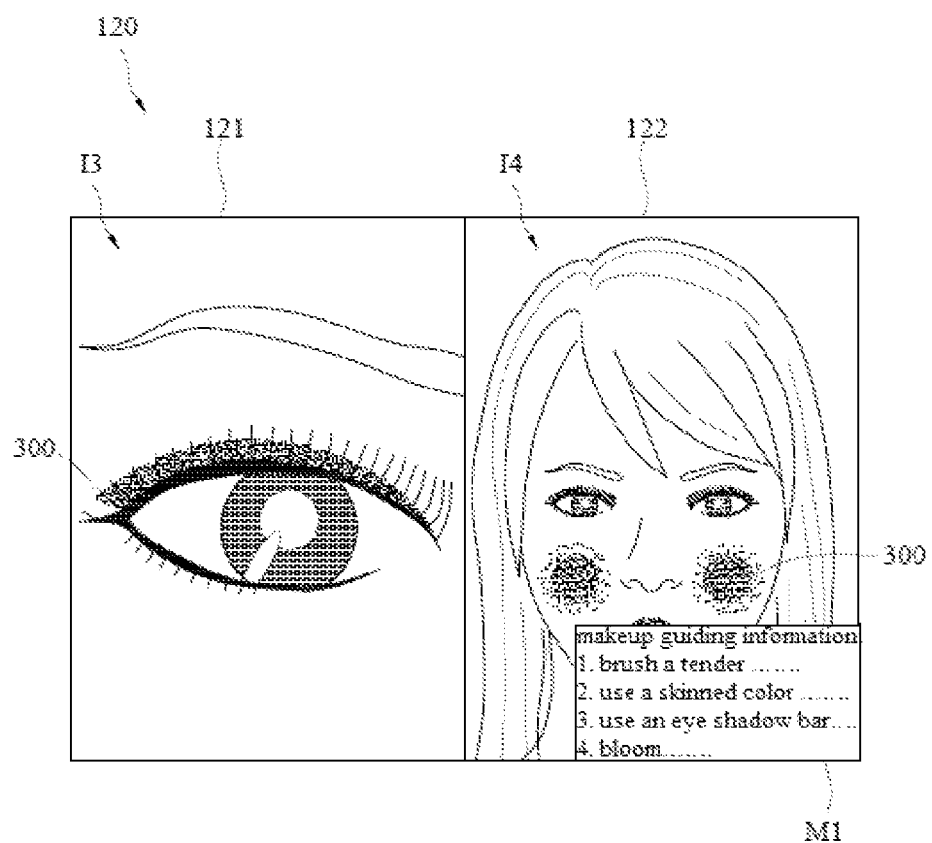
FIG. 16 is a schematic diagram showing a first output image and a makeup real-time face image with makeup and makeup guiding information are displayed in an embodiment.

FIG. 14 is a flow chart showing a face image display method in a fourth embodiment. FIG. 15 is a schematic diagram showing a first output image and a real-time face image with makeup guiding information are displayed in an embodiment. FIG. 16 is a schematic diagram showing a first output image and a real-time face image with makeup and makeup guiding information are displayed in an embodiment. Please refer to FIG. 14 to FIG. 16, in an embodiment, the electronic device 100 further includes an information generating unit 150 connected to the image processing unit 110.

The information generating unit 150 generates makeup guiding information M1 corresponding to at least one virtual makeup 300 according to at least one makeup selection signal (step S70). Then, the display unit 120 displays the makeup guiding information M1 on the real-time face image (the real-time face image without makeup or the makeup real-time image with makeup) in the second display area 122 (step S80). In an embodiment, as shown in FIG. 15, the display unit 120 displays the real-time face image I5 (that is, the real-time face image without makeup) and the makeup guiding information M1 on the second display area 122 simultaneously. Then, the face without makeup (such as the face of the real-time face image I5) and at least one of face feature (such as the face feature of the first output image I3) with makeup can be seen in comparison. Additionally, the makeup guiding information M1 provides the way about how to makeup. In an embodiment, as shown in FIG. 16, the display unit 120 displays the makeup real-time face image I4 (that is, the real-time face image with makeup) and the makeup guiding information M1 simultaneously. Then, the whole face with makeup (such as the real-time face image I4) and at least one of face feature (such as the first output image I3) with makeup are shown on the display unit 120 simultaneously. Additionally, the makeup guiding information M1 provides the way about how to makeup.

Figure 17:
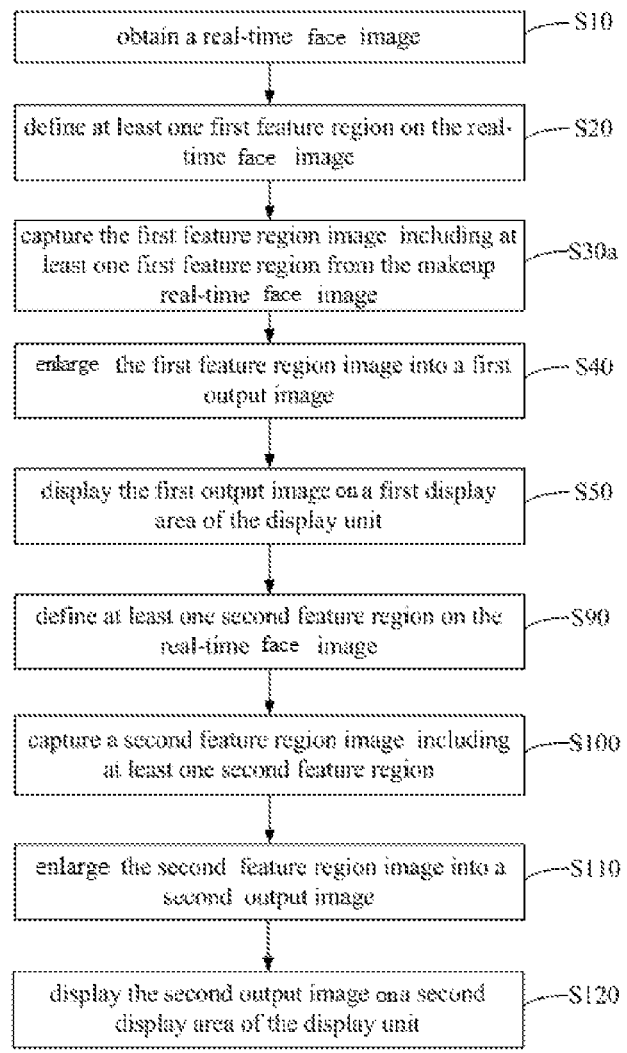
FIG. 17 is a flow chart showing a face image display method in a fifth embodiment.
Figure 18:
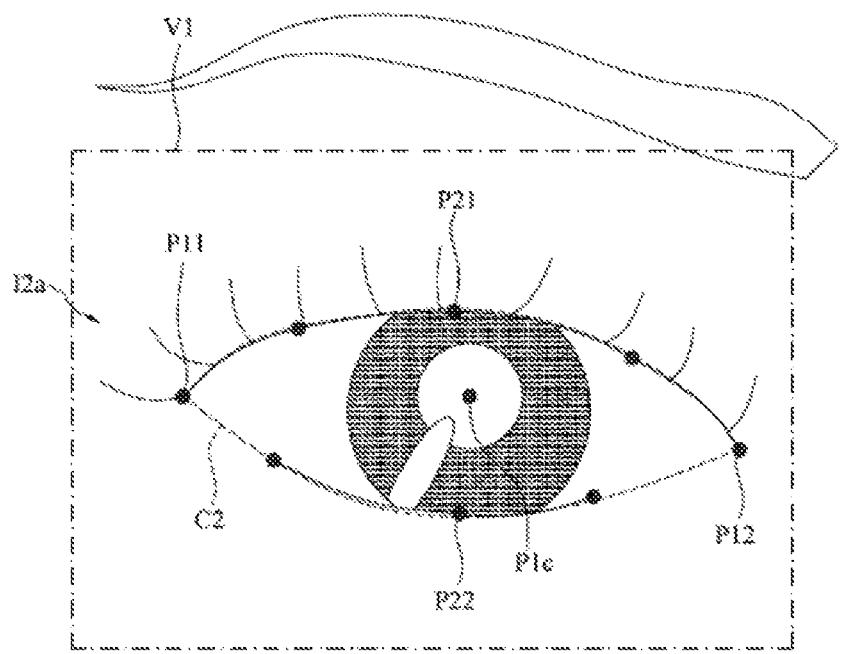
FIG. 18 is a schematic diagram showing a second feature region image is captured in an embodiment.
Figure 19:
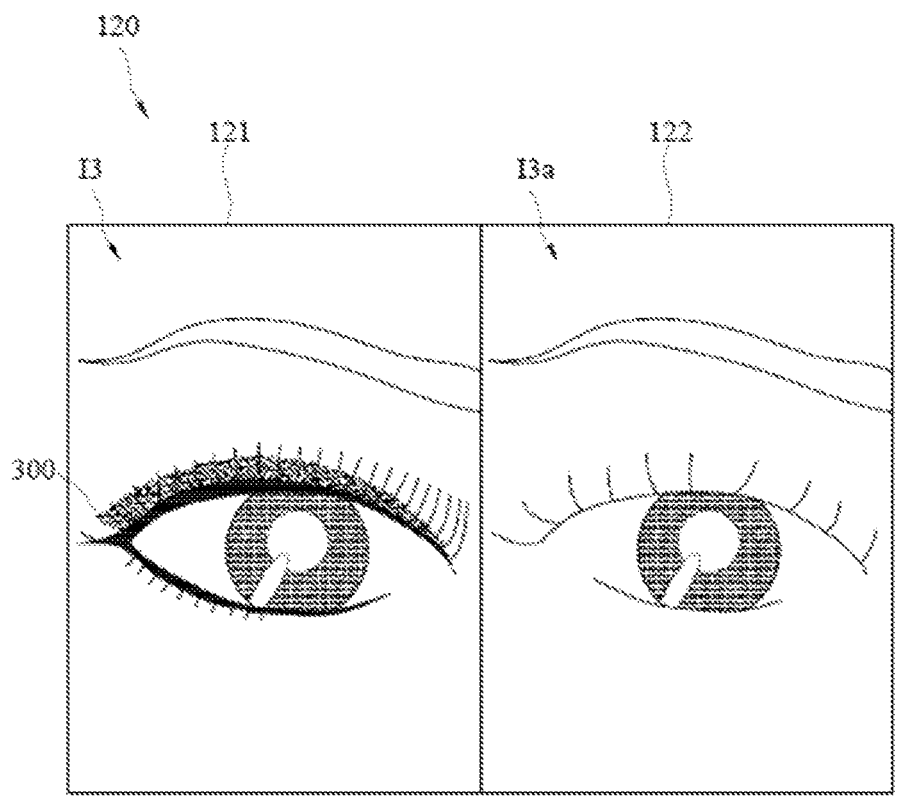
FIG. 19 is a schematic diagram showing a first output image and a second output image are displayed in an embodiment.

FIG. 17 is a flow chart showing a face image display method in a fifth embodiment. FIG. 18 is a schematic diagram showing a second feature region is captured in an embodiment. FIG. 19 is a schematic diagram showing a first output image and a second output image are displayed in an embodiment.

In an embodiment, please refer to FIG. 16 to FIG. 19, the image processing unit 110 defines at least one second feature region C2 on the real-time face image with makeup (he real-time face image I4) or without makeup (such as the real-time face image I5 face) (step S90). A second feature region image I2a including at least one second feature region C2 is captured from the real-time face image with or without makeup (step S100). After step S110, the image processing unit 110 magnifies the second feature region image I2a into a second output image I3a (step S110). Then, the display unit 120 displays the second output image I3a on the second display area 122 (step S120).

In step S90, the image processing unit 110 finds the second feature region C2 via a manner similar to the step S20. In other words, the second feature region C2 is a range surrounded by a plurality of feature points P1 corresponding to the face feature to be magnified.

In an embodiment, the face feature corresponding to the second feature region C2 is different from the face feature corresponding to the first feature region C1. The face feature in the first output image I3 includes the virtual makeup 300. The face feature in the second output image I3a also includes virtual makeup 300. Then, the different face features with the makeup can be shown simultaneously.

In an embodiment, the face feature corresponding to the second feature region C2 is similar to the face feature corresponding to the first face feature C1. The face feature in the first output image I3 includes the virtual makeup 300, and the face feature in the second output image I3a has no virtual makeup 300. As shown in FIG. 19, the second output image I3a without the virtual makeup 300 is displayed on the second display area 122 of the display unit 120. The first output image I3 with the virtual makeup is displayed on the first display area 121 of the display unit 120. Consequently, the face feature without makeup (such as the face feature of the second output image I3a) and the face feature with makeup (such as the face feature of the first output image I3) can be seen.

Figure 20:
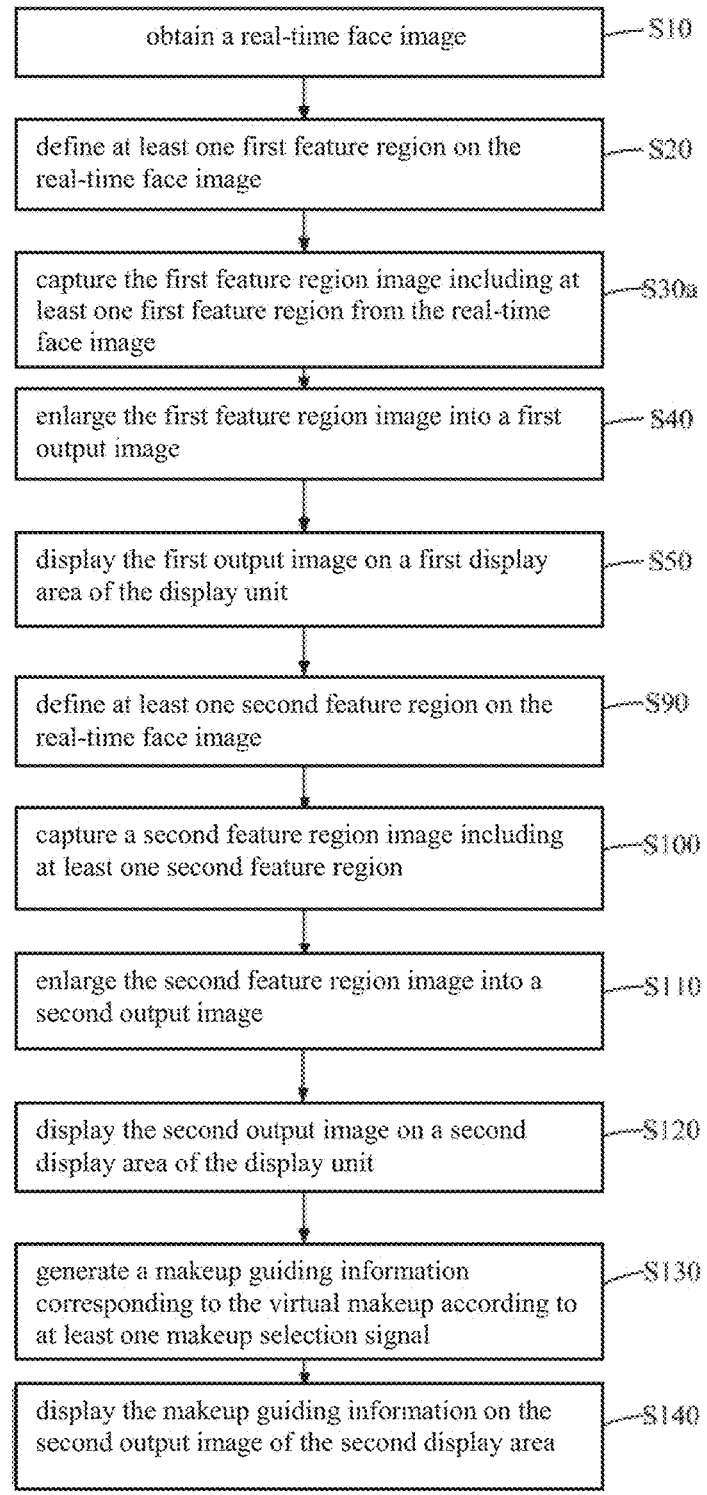
FIG. 20 is a flow chart showing a face image display method in a sixth embodiment.
Figure 21:
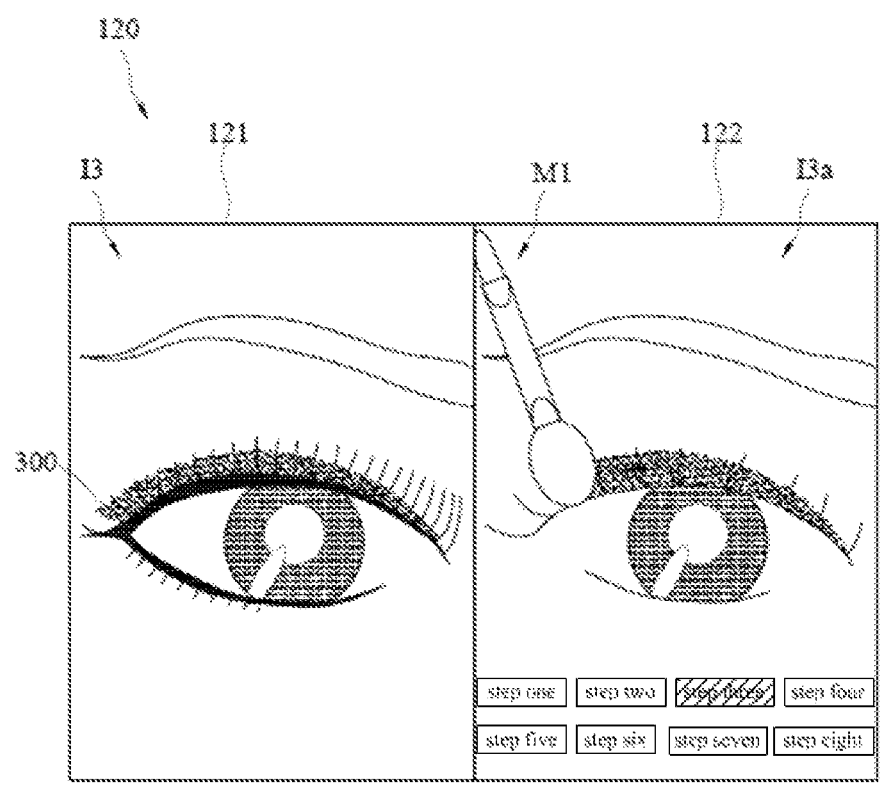
FIG. 21 is a schematic diagram showing a first output image and a second output image with makeup guiding information are displayed in an embodiment.

FIG. 20 is a flow chart showing a face image display method in a sixth embodiment. FIG. 21 is a schematic diagram showing a first output image and a second output image with makeup guiding information are displayed in an embodiment.

In an embodiment, please refer to FIG. 20 and FIG. 21, the information generating unit 150 generates the makeup guiding information M1 corresponding to the virtual makeup 300 according to at least one makeup selection signal (step S130). As shown in FIG. 21, the display unit 120 displays the makeup guiding information M1 on the second output image I3a of the second display area 122 (step S140). Consequently, the makeup guiding information M1 guides the user to draw a makeup pattern same as that displayed at the first display area 121.

In an embodiment, the makeup guiding information M1 includes makeup operations, procedures, introductions and notice of the makeup pattern selected by the user.

In an embodiment, as shown in FIG. 15, the makeup guiding information M1 is displayed in a text mode, which is not limited herein. In another embodiment, the makeup guiding information M1 is displayed in an animation mode. As shown in FIG. 21, one or more options is displayed on the second output image I3a for selecting, and the corresponding makeup guiding information M1 is presented in a dynamic manner at the second display area 122 when the option is selected by the user.

In an embodiment, before the display unit 120 displays the images, the image processing unit 110 executes a position correction on the images (the first output image I3, the second output image I3a, the makeup real-time face image I4 and the pre-makeup real-time face image I5) to be displayed. The face of each image is adjusted to align center of the display area and displayed in a specific proportion of the display area of the display unit 120. As a result, when the user is in the capturing range of the image capturing unit 130 but not right in front of the image capturing unit 130. For example, when the user is in the right side of the capturing range of the image capturing unit 130, the user's face of each image displayed on the display area of the display unit 120 are kept in the center of the display area without deviating.

In an embodiment, the electronic device 100 is a notebook computer, a tablet computer, a smart phone or other electronic devices.

In an embodiment, the image processing unit 110, the virtual makeup unit 140 and the information generating unit 150 are implemented by one or more processing components. The processing component is a central processing unit (CPU), a controller or a micro-processor. Moreover, the display unit 120 is a liquid crystal display (LCD) screen or a light emitting diode (LED) screen, which is not limited herein.

In an embodiment, the storage unit 160 is implemented by one or more storage components. The storage component is a non-volatile memory, such as a read only memory (ROM) or a flash memory and so on, or a volatile memory, such as a random access memory (RAM).

In an embodiment, the face image display method is implemented by a computer readable storage medium. A plurality of program codes are stored in the computer readable storage medium. After the program codes are loaded and executed by the electronic device 100, the electronic device 100 performs the face image processing method in the embodiments. In an embodiment, the computer readable storage medium is an internal storage component in the electronic device 100. In an embodiment, the computer readable storage medium is a remote storage component, and program codes are transmitted to the electronic device 100 wiredly or wirelessly. In an embodiment, the computer readable storage medium is an external storage component of the electronic device 100, and the computer readable storage medium is connected to and accesses the program codes via a reader or a connector of the electronic device 100.

In sum, the electronic device and the display method thereof captures a feature region image corresponding to at least one face feature from the real-time face image according to feature points obtained by detecting the face. The feature region image are magnified and displayed on the display unit. Then, the details of the face feature can be seen clearly. Moreover, according to the electronic device and the display method thereof in embodiments, a virtual makeup is combined into a real-time face image without makeup. The appearance of at least one face feature with makeup is shown easily. Further, in embodiments, the feature region image captured from the real-time face image combined the virtual makeup is displayed with the original real-time face image (that is, a real-time face image without a virtual makeup) or/and another feature region image captured from the original real-time face image simultaneously. As a result, the difference before and after makeup can be shown in contrast via the two images.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A face image display method, applied to an electronic device with a display unit, the method comprising:
   obtaining a plurality of real-time face images;
   defining a first feature region on the plurality of real-time face images;
   receiving a feature enlarging signal;
   retrieving a plurality of feature points in the first feature region according to the feature enlarging signal;
   determining a central point according to the feature points, wherein the central point is a middle point among all the feature points or a feature point among all the feature points;
   generating a capturing frame including all the feature points based on the central point;
   capturing a plurality of first feature region images from the plurality of real-time face images according to the capturing frame;
   generating a stable feature region image by performing a median operation on the plurality of first feature region image;
   enlarging the stable feature region image into a first output image; and
   displaying the first output image on a first display area of the display unit.

2. The face image display method according to claim 1, wherein the step of obtaining a plurality of real-time face images further includes:
   receiving a plurality of real-time images; and
   executing a face detection on the plurality of real-time images to obtain the plurality of real-time face images.

3. The face image display method according to claim 2, wherein each of the real-time face image is a real-time face image without makeup or a real-time face image with makeup, and each of the first feature region image is captured from the real-time face image with makeup.

4. The face image display method according to claim 3, wherein the plurality of real-time face images with makeup is generated by combining a virtual makeup generated according to a virtual makeup signal and the plurality of real-time face images without makeup.

5. The face image display method according to claim 4, further comprising:
   displaying one of the plurality of real-time face images with or without makeup on a second display area of the display unit.

6. The face image display method according to claim 5, further comprising:
   generating makeup guiding information corresponding to the virtual makeup according to a makeup selection signal; and
   displaying the makeup guiding information on the plurality of real-time face images with or without makeup of the second display area.

7. The face image display method according to claim 4, further comprising:
   defining a second feature region on the plurality of real-time face images with or without makeup;
   capturing a second feature region image including the second feature region from the plurality of real-time face images with or without makeup;
   enlarging the second feature region image into a second output image; and
   displaying the second output image at a second display area of the display unit.

8. The face image display method according to claim 7, further comprising:
   generating makeup guiding information corresponding to the virtual makeup according to a makeup selection signal; and
   displaying the makeup guiding information on the second output image of the second display area.

9. The face image display method according to claim 1, wherein after the step of obtaining the plurality of real-time face images, the face image display method further includes:

displaying one of the plurality of real-time face images on a second display area of the display unit.

10. A non-transitory computer readable storage medium storing a plurality of program codes, an electronic device loads and executes the program codes to make the electronic device perform steps:
obtaining a plurality of real-time face images;
defining a first feature region on the plurality of real-time face images;
receiving a feature enlarging signal;
retrieving a plurality of feature points in the first feature region according to the feature enlarging signal;
determining a central point according to the feature points, wherein the central point is a middle point among all the feature points or a feature point among all the feature points;
generating a capturing frame including all the feature points based on the central point
capturing a plurality of first feature region images from the plurality of real-time face images according to the capturing frame;
generating a stable feature region image by performing a median operation on the plurality of first feature region image;
enlarging the stable feature region image into a first output image; and
displaying the first output image on a first display area of the display unit.

11. An electronic device, comprising:
an image processing unit, defining a first feature region on a plurality of real-time face images, receiving a feature enlarging signal, retrieving a plurality of feature points in the first feature region according to the feature enlarging signal, determining a central point according to the feature points, wherein the central point is a middle point among all the feature points or a feature point among all the feature points, generating a capturing frame including all the feature points based on the central point, capturing a plurality of first feature region images from the plurality of real-time face images according to the capturing frame;
generating a stable feature region image by performing a median operation on the plurality of first feature region image, and enlarging the stable feature region image into a first output image, wherein each of the first feature region image including the first feature region; and
a display unit including a first display area and configured for displaying the first output image on the first display area.

12. The electronic device according to claim 11, further comprising:
an image capturing unit, capturing a plurality of real-time images, wherein the image processing unit executes a face detection on the plurality of real-time images to obtain the plurality of real-time face images.

13. The electronic device according to claim 11, wherein the image processing unit further receives a feature enlarging signal, the image processing unit generates a capturing frame including the first feature region according to the feature enlarging signal, and the image processing unit captures the plurality of first feature region images from the plurality of real-time face images according to the capturing frame.

14. The electronic device according to claim 11, wherein the display unit further includes a second display area, and the display unit displays the plurality of real-time face images on the second display area.

15. The electronic device according to claim 11, wherein each of the real-time face image is a real-time face image without makeup or a real-time face image with makeup, and each of the first feature region image is captured from the real-time face image with makeup.

16. The electronic device according to claim 15, wherein the electronic device further includes:
a virtual makeup unit, the virtual makeup unit generates a virtual makeup according to a makeup signal;
wherein the image processing unit combines the virtual makeup and the plurality of real-time face images without makeup to form the plurality of real-time face images with makeup.

17. The electronic device according to claim 16, wherein the display unit further includes a second display area, and the display unit displays the plurality of real-time face images with or without makeup on the second display area.

18. The electronic device according to claim 17, further comprising:
an information generating unit, the information generating unit generates a makeup guiding information corresponding to the virtual makeup according to the makeup selection signal, and the display unit displays the makeup guiding information on the plurality of real-time face images with or without makeup of the second display area.

19. The electronic device according to claim 16, wherein the display unit further includes a second display area, the image processing unit defines a second feature region from the plurality of real-time face images with or without makeup, captures a second feature region image including the second feature region, and magnifies the second feature region image into a second output image, and the display unit displays the second output image on the second display area.

20. The electronic device according to claim 19, further comprising:
an information generating unit, wherein the information generating unit generates makeup guiding information corresponding to the virtual makeup according to the makeup selection signal, and the display unit displays the makeup guiding information on the second output image of the second display area.

* * * * *